US009006386B2

(12) United States Patent
Janssen et al.

(10) Patent No.: US 9,006,386 B2
(45) Date of Patent: Apr. 14, 2015

(54) PROCESS FOR THE PREPARATION OF A SUPRAMOLECULAR POLYMER

(75) Inventors: Henricus Marie Janssen, Eindhoven (NL); Gaby Maria Leonarda van Gemert, Roermond (NL); Anton Willem Bosman, Eindhoven (NL)

(73) Assignee: SupraPolix B.V., Eindhoven (NL)

( * ) Notice: Subject to any disclaimer, the term of this patent is extended or adjusted under 35 U.S.C. 154(b) by 646 days.

(21) Appl. No.: 13/289,838

(22) Filed: Nov. 4, 2011

(65) Prior Publication Data
US 2012/0116014 A1 May 10, 2012

Related U.S. Application Data
(60) Provisional application No. 61/410,410, filed on Nov. 5, 2010.

(51) Int. Cl.
C08G 18/32 (2006.01)
C08G 18/80 (2006.01)
C08G 83/00 (2006.01)

(52) U.S. Cl.
CPC .......... C08G 83/008 (2013.01); C08G 18/3246 (2013.01); C08G 18/807 (2013.01)

(58) Field of Classification Search
USPC .................................................. 528/423, 73
See application file for complete search history.

(56) References Cited

U.S. PATENT DOCUMENTS

| | | | |
|---|---|---|---|
| 3,388,087 A | 6/1968 | Dieterich et al. | |
| 3,480,592 A | 11/1969 | Dieterich et al. | |
| 4,093,759 A | 6/1978 | Otsuki et al. | |
| 4,136,092 A | 1/1979 | Jackle et al. | |
| 4,140,759 A | 2/1979 | Mausner | |
| 4,216,318 A | 8/1980 | Brown et al. | |
| 4,229,838 A | 10/1980 | Mano | |
| 4,322,327 A | 3/1982 | Yoshimura et al. | |
| 4,684,728 A | 8/1987 | Mohring et al. | |
| 4,942,035 A | 7/1990 | Churchill et al. | |
| 5,410,016 A | 4/1995 | Hubbell et al. | |
| 5,500,209 A | 3/1996 | Mendolia et al. | |
| 5,548,035 A | 8/1996 | Kim et al. | |
| 5,610,268 A | 3/1997 | Meijer et al. | |
| 5,631,337 A | 5/1997 | Sassi et al. | |
| 5,723,563 A | 3/1998 | Lawrey et al. | |
| 5,736,535 A | 4/1998 | Bernstein et al. | |
| 5,874,069 A | 2/1999 | Mendolia et al. | |
| 5,883,211 A | 3/1999 | Sassi et al. | |
| 5,919,441 A | 7/1999 | Mendolia et al. | |
| 6,320,018 B1 | 11/2001 | Sijbesma et al. | |
| 6,353,076 B1 | 3/2002 | Barr et al. | |
| 6,489,397 B2 | 12/2002 | Kim et al. | |
| 6,534,072 B2 | 3/2003 | Mondet et al. | |
| 6,683,151 B1 | 1/2004 | Loontjens et al. | |
| 6,702,850 B1 | 3/2004 | Byun et al. | |
| 6,716,370 B2 | 4/2004 | Kendig | |
| 6,743,767 B2 | 6/2004 | Goldoni et al. | |
| 6,803,447 B2 | 10/2004 | Janssen et al. | |
| 6,803,477 B2 | 10/2004 | Prakash et al. | |
| 6,818,018 B1 | 11/2004 | Sawhney | |
| 6,899,992 B2 | 5/2005 | Huang et al. | |
| 6,911,296 B2 | 6/2005 | Pappas et al. | |
| 6,939,938 B2 | 9/2005 | Benard et al. | |
| 6,972,304 B2 | 12/2005 | Smith et al. | |
| 7,196,073 B2 | 3/2007 | Marciani | |
| 7,622,131 B2 | 11/2009 | Bosman et al. | |
| 7,736,663 B2 | 6/2010 | Cooper et al. | |
| 7,838,621 B2 | 11/2010 | Janssen et al. | |
| 7,862,805 B2 | 1/2011 | Mougin et al. | |
| 2003/0015185 A1 | 1/2003 | Dutart | |
| 2003/0092838 A1 | 5/2003 | Fomperie et al. | |
| 2003/0158403 A1 | 8/2003 | Manoharan et al. | |
| 2004/0023155 A1 | 2/2004 | Hayakawa et al. | |
| 2004/0087755 A1 | 5/2004 | Eling et al. | |
| 2007/0149751 A1 | 6/2007 | Lindsay et al. | |
| 2007/0264208 A1 | 11/2007 | Mougin et al. | |

(Continued)

FOREIGN PATENT DOCUMENTS

EP 0 025 992 A2 9/1983
EP 0 433 188 A1 6/1991

(Continued)

OTHER PUBLICATIONS

Brunsveld et al., "Supramolecular Polymers," Chemical Reviews, 101:4071-4097 (2001).
Cate et al., "Hydrogen-Bonded Supramolecular Polymers with Tunable Material Properties," Polymer Preprints, 44(1):618-619 (2003).
Dieterich et al, "Polyurethane Ionomers, a New Class of Block Polymers," Angewandte Chemie Intternational Edition, 9(1):40-50 (1970) (English version of German article in Angewandte Chemie, 2:40-50 (1970).
El-Ghayoury et al., "Supramolecular Hydrogen-Bonded Oligo(p-phenylene vinylene) Polymers," Angewandte Chemie International Edition, 40(19):3660-3663 (2001).
Even et al., "Synthesis and Characterization of Amphiphilic Triblock Polymers by Copper Mediated Living Radical Polymerization," European Polymer Journal, 39:633-639 (2003).
Flory, "Random Reorganization of Molecular Weight Distribution in Linear Condensation Polymers," Journal of American Chemical Society, 64:2205-2212 (1942).
Folmer et al., "Supramolecular Polymer Materials: Chain Extension of Telechelic Polymers Using a Reactive Hydrogen-Bonding Synthon," Advanced Materials, 12(12):874-878 (2000).
Guan et al., "Modular Domain Structure: A Biomimetic Strategy for Advanced Polymeric Materials," Journal of American Chemical Society, 126:2058-2065 (2004).

(Continued)

*Primary Examiner* — Brieann R Fink
(74) *Attorney, Agent, or Firm* — Gilberto M. Villacorta; Sunit Talapatra; Foley & Lardner LLP

(57) ABSTRACT

The invention relates to a process for the preparation of a supramolecular polymer comprising 1-50 4H-units, in which a 4H building block is reacted with a prepolymer, wherein a 4H building block comprises a 4H-unit and a reactive group according to Formula (I):

$$4H\text{-}(L\text{-}F_i)_r \qquad (I)$$

wherein 4H represents a 4H-unit, L represents a divalent, trivalent, tetravalent or pentavalent linking group, $F_i$ represents a reactive group, and r is 1-4, is reacted with a prepolymer comprising a complementary reactive group, wherein the reaction mixture comprising said 4H building block and said polymer comprises less than 10 wt. % of a non-reactive organic solvent, based on the total weight of the reaction mixture.

23 Claims, No Drawings

(56) References Cited

U.S. PATENT DOCUMENTS

| | | |
|---|---|---|
| 2008/0260795 A1 | 10/2008 | Baughman et al. |
| 2009/0004274 A1 | 1/2009 | Hoorne-Van Gemert et al. |
| 2009/0111930 A1 | 4/2009 | Van Gemert et al. |
| 2009/0130172 A1 | 5/2009 | Dankers et al. |
| 2010/0076147 A1 | 3/2010 | Hoorne-Van Gemert et al. |
| 2011/0034641 A1 | 2/2011 | Janssen et al. |
| 2011/0229724 A1 | 9/2011 | Hoorne-Van Gemert et al. |
| 2012/0116014 A1 | 5/2012 | Janssen et al. |

FOREIGN PATENT DOCUMENTS

| | | |
|---|---|---|
| EP | 0 683 769 B1 | 11/1995 |
| EP | 0 744 428 A2 | 11/1996 |
| EP | 0 877 055 B1 | 11/1998 |
| EP | 1 213 309 A1 | 6/2002 |
| EP | 1 310 533 A2 | 5/2003 |
| EP | 1 687 378 A1 | 8/2006 |
| EP | 1 310 533 B2 | 1/2007 |
| EP | 1 392 222 B1 | 9/2007 |
| EP | 2 450 394 A1 | 5/2012 |
| FR | 2657082 A1 | 7/1991 |
| FR | 2825628 B1 | 12/2002 |
| JP | 48 029398 B | 9/1973 |
| JP | 51 022823 A | 2/1976 |
| JP | 52 074692 A | 6/1977 |
| JP | 2004-250623 A | 9/2004 |
| RU | 910718 A1 | 3/1982 |
| WO | WO-98/14504 A1 | 4/1998 |
| WO | WO-98/14505 A1 | 4/1998 |
| WO | WO-98/23307 | 6/1998 |
| WO | WO-99/07343 A1 | 2/1999 |
| WO | WO-01/44307 A2 | 6/2001 |
| WO | WO-02/34312 A1 | 5/2002 |
| WO | WO-02/46260 A1 | 6/2002 |
| WO | WO-02/098377 A1 | 12/2002 |
| WO | WO-03/032929 A2 | 4/2003 |
| WO | WO-03/059964 A2 | 7/2003 |
| WO | WO-03/099875 A2 | 12/2003 |
| WO | WO-2004/016598 A1 | 2/2004 |
| WO | WO-2004/052963 A1 | 6/2004 |
| WO | WO-2005/042641 A1 | 5/2005 |
| WO | WO-2006/006855 A1 | 1/2006 |
| WO | WO-2006/118460 A1 | 11/2006 |
| WO | WO-2006/118461 A2 | 11/2006 |
| WO | WO-2007/058539 A2 | 5/2007 |
| WO | WO-2007/072000 A1 | 6/2007 |
| WO | WO-2008/063057 A3 | 5/2008 |
| WO | WO-2010/002262 A1 | 1/2010 |

OTHER PUBLICATIONS

Guan et al., "Synthesis and Single-Molecule Studies of Modular Polymers Using Precise Hydrogen Bonding Interactions," Polymer Preprints, 44(2):485-486 (2003).

Hirschberg et al., "Helical Supramolecular Aggregates Based on Ureidopyrimidinone Quadruple Hydrogen Bonding," Chemistry—A European Journal, 9:4222-4231 (2003).

Hirschberg et al., "Supramolecular Polymers from Linear Telechelic Siloxanes with Quadruple-Hydrogen-Bonded Units," Macromolecules, 32(8):2696-2705 (1999).

Hirschberg et al., "Ureidotriazine-Based Supramolecular Copoloymers," Marcomolecules, 36:1429-1432 (2003).

Hofmeier et al., "New Supramolecular Polymers Containing Both Terpyridine Metal Complexes and Quadruple Hydrogen Bonding Units," Chemical Communications, 318-319 (2004).

Kato, "Supramolecular Liquid Crystal Polymers, Formation of Molecular Self-Organized Structures and Their Functionalization," Kobunshi Ronbunshu, 54(12):855-862 (1997). (Abstract on last page).

Kautz et al., "Cooperative End-to-End and Lateral Hydrogen-Bonding Motifs in Supramolecular Thermoplastic Elastomers," Macromolecules, 39:4265-4267 (2006).

Kiriy et al., "Atomic Force Microscopy Visualization of Single Star Copolymer Molecules," Polymeric Materials: Science & Engineering, 88:233-234 (2003).

Korshak et al., "Experimental Methods of Bulk Polymerization," Comprehensive Polymer Science: The Synthesis, Characterization, Reactions & Application of Polymers, 5:131-142 (1989).

Lange et al., "Hydrogen-Bonded Supramolecular Polymer Networks," Journal of Polymer Science, Polymer Chemistry Edition, Interscience Publishers, 37:3657-3670 (1999).

Lange et al., "Supramolecular Polymer Interactions Based on the Alternating Copolymer of Styrene and Maleimide," Macromolecules, 28:782-783 (1995).

Lee et al., "Hydrogels for Tissue Engineering," Chemical Reviews, 101(7):1869-1879 (2001).

Matsuda et al., "Terminally Alkylated Heparin. 1. Antithrombogenic Surface Modifier," Biomacromolecules, 2:1169-1177 (2001).

Maynard et al., "Inhibition of Cell Adhesion to Fibronectin by Oligopeptide-Substituted Polynorbornenes," Journal of American Chemical Society, 123:1275-1279 (2001).

Menger et al., "Self-Adhesion Among Phospholipd Vesicles," Journal of the American Chemical Society, 128:1414-1415 (2006).

Rieth et al., "Polymerization of Ureidopyrimidinone-Functionalized Olefins by Using Late-Transition Metal Ziegler-Natta Catalysts: Synthesis of Thermoplastic Elastomeric Polyolefins," Angewandte Chemie International Edition, 40(11):2153-2156 (2001).

Roland et al., "Synthesis of Titin-Mimicking Polymers Having Modular Structures by Using Noncovalent Interactions," Polymer Preprints, 44(1):726-727 (2003).

Rowley et al., "Alginate Hydrogels as Synthetic Extracellular Matrix Materials," Biomaterials, 20:45-53 (1999).

Saunders et al. (editors), "Polyurethanes—Chemistry and Technology High Polymers: Part 1. Chemistry," High Polymers, Interscience Publishers a Division of Wiley & Sons, 26(1):68-73 (1962).

Sijbesma et al., "Reversible Polymers Formed from Self-Complementary Monomers Using Quadruple Hydrogen Bonding," Science, 278:1601-1604 (1997).

Uhrich et al., "Polymeric Systems for Controlled Drug Release," Chemical Reviews, 99:3181-3198 (1999).

Urbanski et al. "Potential Antimalarial Compounds. IX. Pyrimidine Derivatives of Urea and Guanidine," Journal of Medicinal Chemistry, 10:521-525 (1967).

Vulic et al., "Heparin-Containing Block Copolymers," Journal of Materials Science: Materials Medicine, 4:353-365 (1993).

Weast et al. (editors), "CRC Handbook of Chemistry & Physics, 59th Edition," CRC Press, Inc., 3 pages (1978-1979).

Yamauchi et al., "Thermoreversible Poly(alkyl acrylates) Consisting of Self-Complementary Multiple Hydrogen Bonding," Macromolecules, 36:1083-1088 (2003).

Yamauchi et al., Abstract of "Synthesis and Characterization of Novel Multiple-Hydrogen Bonded Macromolecules Via A Michael Reaction," Dept. of Chemistry, Virginia Polytechnic Institute and State University, 1 page.

Yamauchi, et al., "Thermoreversible Polyesters Consisting of Multiple Hydrogen Bonding (MHB)," Macromolecules, 37(10):3519-3522 (2004).

PROCESS FOR THE PREPARATION OF A SUPRAMOLECULAR POLYMER

CROSS-REFERENCE TO RELATED PATENT APPLICATIONS

This application claims priority from U.S. Provisional Application No. 61/410,410, filed Nov. 5, 2010, incorporated herein by reference in its entirety.

FIELD OF THE INVENTION

The invention relates to a process for the preparation of a supramolecular polymer comprising a quadruple hydrogen bonding unit (abbreviated herein as "4H-unit") wherein a 4H-unit comprising a reactive group is reacted with a prepolymer comprising a complementary reactive group, wherein the reaction mixture comprising said 4H-unit and said polymer comprises less than 10 wt. % of an organic solvent. The reaction is preferably performed at temperatures below about 100° C. The resulting supramolecular polymer shows unique new characteristics due to the presence of additional physical interactions between the polymer chains that are based on multiple hydrogen bonding interactions (supramolecular interactions) and benefit from easier and faster preparation and handling using known reactive-processing techniques.

BACKGROUND OF THE INVENTION

This invention relates to a process for the preparation of a supramolecular polymer comprising a 4H-unit that is capable of forming at least four H-bridges in a row, preferably with another 4H-unit, leading to physical interactions between different polymer chains. The physical interactions originate from multiple hydrogen bonding interactions (supramolecular interactions) between individual 4H-units or between a 4H-unit and another moiety capable of forming hydrogen bonds thereby forming self-complementary units, preferably comprising at least four hydrogen bonds in a row. Units capable of forming at least four hydrogen bonds in a row, i.e. quadruple hydrogen bonding units, are in this patent application abbreviated as "4H-units". Sijbesma et al. (U.S. Pat. No. 6,320,018; Science 278, 1601-1604, 1997; both incorporated by reference herein) discloses 4H-units that are based on 2-ureido-4-pyrimidones. These 2-ureido-4-pyrimidones in their turn are derived from isocytosines.

Telechelic polymers or trifunctional polymers have been modified with 4H-units (Folmer, B. J. B. et al., Adv. Mater. 12, 874-878, 2000; Hirschberg et al., Macromolecules 32, 2696-2705, 1999; Lange, R. F. M. et al, J. Polym. Sci. Part A, 37, 3657-3670, 1999; all incorporated by reference). However, these polymers are obtained by addition of solid reactants to chloroform or toluene solutions, which are both toxic organic solvents, and need prolonged reaction times of several hours in order to reach completion.

US 2004/087755, incorporated by reference, discloses polyurethane based polymers with 4H-units as end-cappers that can be used as hot melt adhesive. Example 4 in this patent discloses the preparation of supramolecular polyurethane polymers which are obtained by the bulk reaction of 6-methyl-isocytosine with 4,4'-methylene bis(phenyl isocyanate) (MDI) end-capped polyesters in the melt at 180° C., said reaction being performed in a Brabender mixer with a residence time of not more than 3 minutes. In this process it is preferred that the 6-methyl-isocytosine is added as a powder that is finely milled to a particular particle size to facilitate rapid and efficient conversion.

JP 2004250623, incorporated by reference, discloses polyester diols derived from poly(butanediol terephthalate) or polylactide that are reacted in the melt with a solid reactant comprising isocyanato functional 4H-unit, obtained by the reaction of a diisocyanate with 6-methyl-isocytosine. The reaction proceeds by kneading at 150° C. to 300° C., preferably at 160° C. to 250° C. and more preferably at 180° C. to 230° C. JP 2004250623 further discloses that it is desirable to perform the reaction above the melting point of the polymer. However, in order to control decomposition of the reactants and final products, the reaction is desirably performed at a temperature as low as possible, provided that the reactants are prevented to solidify as much as possible during the reaction. According to the examples, the reaction requires temperatures of 200° C. or higher and an excess of the isocyanato functional 4H-unit. Comparable functionalization of poly(butanediol terephthalate) and poly(butanediol isophthalate) with this isocyanato functional 4H-unit at temperatures above 180° C. are also disclosed by Yamauchi et al. (Macromolecules 37, 3519-3522, 2004; incorporated by reference). In both cases the excess of the 4H-unit in the synthesis has been removed using organic solvents (Soxhlet-extraction with methanol or precipitation from HFIP), thereby re-introducing the need of (toxic) organic solvents into the process. Moreover, the occurrence of side reactions with the isocyanate functional compound, like allophonate, biuret or isocyanurate formation, is eminent at the temperatures applied as is well known in the art (High Polymers Vol. XVI, Polyurethanes: chemistry and technology, Part 1, Ed.: J. B. Saunders and K. C. Frisch; J. Wiley & Sons, 1962; incorporated by reference).

Additionally, US 2010/0076147, incorporated by reference, discloses supramolecular polymers comprising 4H-units which are obtained by reactive extrusion in the melt at temperatures below 150° C. In order to be able to perform the melt processing, the 4H-units have been modified with e.g. $C_2$-$C_{20}$ alkyl chains on the heterocyclic ring structure in order to lower their melting point. Therefore, only specific, synthetically demanding, 4H-units can be used in this approach. Moreover, the 4H-unit is a powder at handling temperatures and needs relatively high processing temperatures (Examples 15-18 disclose reaction temperatures of 120° C. to 140° C. for the conversion into a supramolecular polymer.

Clearly, there is a need in the art for a process for the preparation of a supramolecular polymer containing a 4H-unit that does not require one or more organic solvents because of toxicological, ecological and economical reasons. Moreover, there is a need in the art for a bulk process that can be performed at temperatures below about 100° C. in which the different ingredients are formulated as liquids and can be dosed using known liquid-handling techniques in the art. There is also a need in the art for a broad range of liquid formulations comprising reactive 4H-units thereby facilitating essentially solvent-free processing of liquid reactants at moderate temperatures.

SUMMARY OF THE INVENTION

The present invention discloses a process for the preparation of a supramolecular polymer comprising 1-50 4H-units, in which a 4H building block is reacted with a prepolymer, wherein a 4H building block comprising a 4H-unit and a reactive group according to Formula (I):

4H-(L-F$_i$)$_r$          (I)

wherein 4H represents a 4H-unit, L represents a divalent, trivalent, tetravalent or pentavalent linking group, $F_i$ represents a reactive group, and r is 1-4, is reacted with a prepolymer comprising a complementary reactive group, wherein the reaction mixture comprising said 4H building block and said polymer comprises less than 10 wt. % of a non-reactive organic solvent, based on the total weight of the reaction mixture.

DETAILED DESCRIPTION OF THE INVENTION

The verb "to comprise" as is used in this description and in the claims and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

(Self)-complementary units capable of forming at least four hydrogen bonds form in principle non-covalent moieties with each other. However, it is within the scope of this invention that these units can form non-covalent moieties with other materials capable of forming less than four hydrogen bonds. The hydrogen bonding sites comprising one Bonding Unit can form a non-self-complementary or a self-complementary binding group. Non-self-complementary means that a 4H-unit A forms a bonding moiety A-B with a unit B, wherein B is a different 4H-unit. Self-complementary means that two 4H-units A form a bonding moiety A-A. It is preferred that the 4H-unit is self-complementary.

The term "(self)-complementary units capable of forming four hydrogen bonds in a row is used in its abbreviated form "4H-unit". Hence, a "supramolecular polymer comprising a (self-)complementary unit capable of forming at least four hydrogen bonds in a row" is in this document alternatively indicated as a "supramolecular polymer comprising a 4H-unit". The 4H-unit is covalently attached to or covalently incorporated in the polymer chain.

A liquid means a fluid that has a kinematic viscosity of about 2 to about 2000 cSt at a temperature of about 20° C. to about 100° C.

A solvent means a liquid that is present during a (reactive) processing step but that is not significantly consumed or modified during said processing step and hence needs to be removed after processing to obtain the product.

It was unexpectedly found that 4H-units comprising a reactive group (i.e., a 4H building block) could be formulated in reactive solvents such as liquid (di)isocyanates, liquid polyols, liquid polyamino-alcohols and/or liquid polyamines or could be obtained in a liquid form as such. In this way, the 4H-units can be handled as a liquid during manufacturing allowing the use of closed systems, pumping, pouring etc., and excluding the need for expensive and cumbersome powder handling techniques and/or the presence of (organic) solvents. This results in supramolecular polymers containing one or more 4H-units with excellent mechanical properties. The process according to the present invention leads therefore to a large improvement in the production and use of these supramolecular polymers since it makes the use of solid, crystalline ingredients and/or reaction temperatures above 140° C. obsolete.

The 4H Building Block

The 4H building block used in the process for the preparation of supramolecular polymers of the present invention is represented by Formula (I),

$$4H\text{-}(L\text{-}F_i)_r \qquad (I)$$

wherein:

4H represents a 4H-unit;

L represents a divalent, trivalent, tetravalent or pentavalent linking group, $F_i$ represents a reactive group, and r is 1-4.

Hence, the 4H-unit may comprise up to four reactive groups $F_1$, $F_2$, $F_3$ and $F_4$.

According to the present invention, r can be from 1 to 4. According to the present invention, r is preferably 1 or 2 and most preferably 2.

According to the present invention, the 4H-unit is preferably (r=1 or 2) represented by the following formulae:

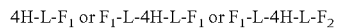

$$4H\text{-}L\text{-}F_1 \text{ or } F_1\text{-}L\text{-}4H\text{-}L\text{-}F_1 \text{ or } F_1\text{-}L\text{-}4H\text{-}L\text{-}F_2$$

wherein $F_1$ and $F_2$ are independent reactive groups, i.e. $F_1$ may be different from or the same as $F_2$.

According to an embodiment, L is a linear, branched or cyclic $C_1$-$C_{20}$ alkylene group, a $C_6$-$C_{20}$ arylene group, a $C_7$-$C_{20}$ arylalkylene group or a $C_7$-$C_{20}$ alkylarylene group, wherein the alkylene group, the arylene group, the arylalkylene group and the alkylarylene group are optionally interrupted by 1-4 atoms selected form the group consisting of O, N, and S.

According to another embodiment, the alkylene group, the arylene group, the arylalkylene group and the alkylarylene group are optionally interrupted by 1-4 groups selected from the group consisting of ureido, urethane, uretdione, isocyanurate, and ester.

According to yet another embodiment, L comprises a polymeric group having a molecular weight in between 500 and 5000 Da and has preferably a glass transition temperature about below 0° C. In this embodiment, L is preferably selected from the group consisting of aliphatic polyethers, aliphatic polyesters, aliphatic polycarbonates, polyorthoesters, polysiloxanes, (hydrogenated) polybutadienes, and poly(meth)acrylates, optionally comprising end groups selected from linear, branched or cyclic $C_1$-$C_{20}$ alkylene groups, $C_6$-$C_{20}$ arylene groups, $C_7$-$C_{20}$ arylalkylene groups, and $C_7$-$C_{20}$ alkylarylene groups.

In general, the structural element that is capable of forming at least four hydrogen bridges (4H) has the general form (1) or (2):

(1)

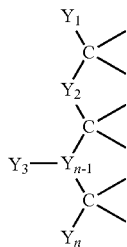

(2)

wherein the C—$X_i$ and the C—$Y_i$ linkages each represent a single or double bond, n is 4 or more, and $X_i$ represent donors or acceptors that form hydrogen bridges with the H-bridge forming monomeric unit containing a corresponding general form (2) linked to them with $X_i$ representing a donor and $Y_i$ an acceptor and vice versa. The structure of these 4H-units is in detail disclosed in U.S. Pat. No. 6,320,018 which is expressly incorporated by reference.

It is preferred that in formulas (1) and (2) n equals 4 so and that the 4H-unit comprises four donors or acceptors in the arrays $X_1 \ldots X_4$ and $Y_1 \ldots Y_4$. The 4H-unit may be self-complementary (i.e. the two hydrogen bonded units have an equal array of donors and acceptors), or non self-complementary (i.e. the two hydrogen bonded units have two different arrays of donors and acceptors). Preferably, the 4H-unit comprises two successive donors, followed by two successive acceptors, i.e. it is preferred that $X_1$ and $X_2$ are donors and $X_3$ and $X_4$ are acceptors. Preferably, the donors and acceptors are O, S, and N atoms.

According to yet another embodiment of the present invention the 4H-unit has the general Formula (III) or Formula (IV), and tautomers thereof:

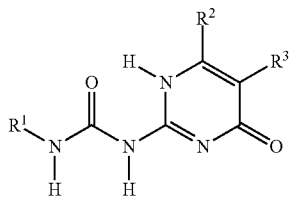

(III)

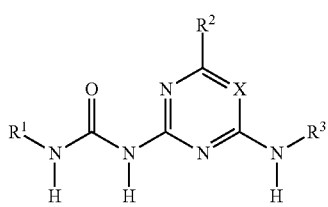

(IV)

wherein X is a nitrogen atom or a carbon atom bearing a substituent $R^8$, preferably a nitrogen atom, and wherein $R^1$, $R^2$, $R^3$ and $R^8$ are independently selected from the group consisting of:
(a) hydrogen;
(b) $C_1$-$C_{20}$ alkyl;
(c) $C_6$-$C_{12}$ aryl;
(d) $C_7$-$C_{12}$ alkaryl;
(e) $C_7$-$C_{12}$ alkylaryl. $R^1$, $R^2$ and $R^3$ may also be a direct bond.

In a first preferred embodiment, the 4H-unit is bonded to linker L via $R^1$ (so that $R^1$ is absent and r=1), while $R^2$, $R^3$ and $R^8$ are independently any one of the groups (a)-(e) defined above, preferably group (a) and (b). Hence, according to this first preferred embodiment, the 4H building block is then represented by:

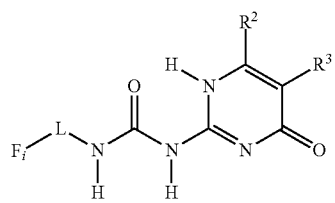

(IIIa)

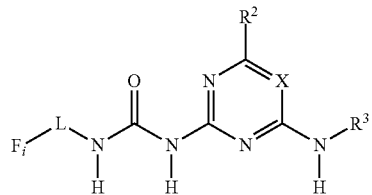

(IVa)

Even more preferably, $R^2$, $R^3$ and $R^8$ are independently selected from hydrogen, methyl, ethyl, n-butyl or t-butyl. Most preferably, $R^2$ is methyl and $R^3$ is hydrogen.

In a second preferred embodiment, the 4H-unit is bonded to linker L via $R^1$ and $R^2$ (so that $R^1$ and $R^2$ are both absent and r=2), while $R^3$ and $R^8$ are selected from any one of the groups (a)-(e) defined above, more preferably from group (a) and (b), most preferably from group (a). Hence, according to this first preferred embodiment, the 4H building block is then represented by:

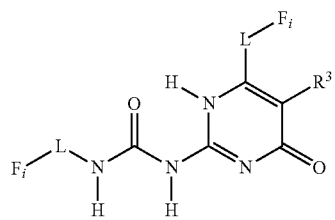

(IIIb)

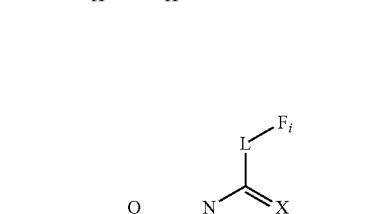

(IVb)

In a third preferred embodiment, the 4H-unit is bonded to linker L via $R^1$ and $R^3$ (so that $R^1$ and $R^3$ are absent and r=2), while $R^2$ and $R^8$ are selected from any one of the groups (a)-(e) defined above, preferably group (b). Even more preferably, $R^2$ is independently selected from methyl, ethyl, n-butyl or t-butyl, most preferably $R^2$ is methyl. Hence, according to this first preferred embodiment, the 4H building block is then represented by:

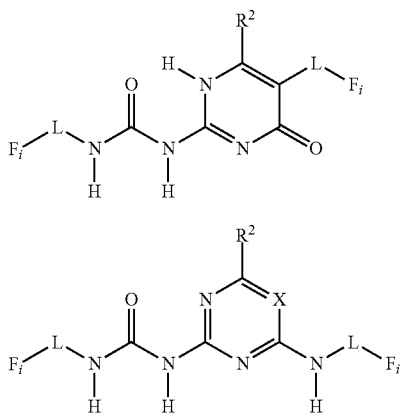

This first and third preferred embodiments are more preferred than the second preferred embodiment, the third preferred embodiment is most preferred.

As will be apparent to the person skilled in the art, the groups (b)-(e) defined above may be linear, branched or cyclic where appropriate.

In this document, the terms "reactive group" and "complementary reactive group" are used interchangeably to indicate reactive groups that are capable to form a bond, preferably a covalent bond, with each other under conventional reaction conditions as will be apparent to a person skilled in the art. Preferably, the reactive groups and complementary reactive groups are selected such that they form a linking group selected from:
—C(O)—O—;
—O—;
—C(O)—N—;
—N(H)—C(O)—O—; and
—N(H)—C(O)—N(H)—;
Preferred examples of pairs of reactive groups and complementary reactive groups are:
carboxylic acid groups/hydroxy groups that can form an ester group —C(O)—O—;
carboxylic acid groups/amine groups that can form an amide group —C(O)—N—;
hydroxy groups/hydroxy groups that can form an ether group —O—;
isocyanate groups/hydroxyl groups than can form a carbamate group —N(H)—C(O)—O—;
isocyanate groups/amine groups than can form an ureido group —N(H)—C(O)—N(H)—.

Instead of a carboxylic acid group, a carboxylic ester or carboxylic acid halide group may be used. Instead of an isocyanate group, a thioisocyante group can be used. Instead of a hydroxyl group, a thiol group may be used. As amine group, a primary, secondary or tertiary amine group may be used (although primary amine groups are preferred). The carboxylic ester group may be activated. The (thio)isocyanate group may be blocked. In this document, "hydroxy" denotes a —OH group.

A "carboxylic acid group" denotes a —C(O)OH group.

A "carboxylic ester group" denotes a —C(O)OR group, wherein R is selected from the group consisting of $C_1$-$C_6$ alkyl, $C_6$-$C_{12}$ aryl, $C_7$-$C_{12}$ arylalkyl and $C_7$-$C_{12}$ alkylaryl groups, wherein the alkyl groups may be linear, branched or cyclic. Arylalkyl groups are groups such as phenylmethyl while alkylaryl groups are groups like 4-methylphenyl.

An "carboxylic acid halide group" denotes a —C(O)X group, wherein X is a chlorine atom, a bromine atom or a iodine atom. Preferably X is a chlorine or a bromine atom.

An "isocyanate" denotes a —NCO group.

A "blocked isocyanate" denotes a —NHC(O)OR* group, wherein R* is a good leaving group. Suitable examples of good leaving groups are phenol-derivatives phenol and thiophenol derivatives, ester derivatives such as the methyl ester of hydroxy-benzoic acid, alcohol derivatives such as 2-ethyl-hexyl-alcohol and t-butyl-alcohol, oxime derivatives such as methyl-ethyl ketoxime, imidazole groups, caprolactam groups and hydroxy-succinimide groups.

A "thioisocyanate group" denotes a —NCS group.

An "blocked thioisocyanate group" denotes a —NHC(S)OR* group, wherein R* is a good leaving group as indicated for "blocked isocyanate".

A "primary amine group" denotes a —NH₂ group.

A "secondary amine group" denotes a —NHR group, wherein R is selected from the group consisting of $C_1$-$C_6$ alkyl, $C_6$-$C_{12}$ aryl, $C_7$-$C_{12}$ alkylaryl and $C_7$-$C_{12}$ arylalkyl groups, wherein the alkyl groups may be linear, branched or cyclic.

An "activated amine" denotes a —C(R)=NOH group (that can be converted into an amine group via the Beckmann rearrangement), a —C(O)N₃ group (that can be converted into an amine group via the Curtius rearrangement), a —C(O)NH₂ group (that can be converted into an amine group via the Hofmann rearrangement), a —NHC(O)R group wherein R is selected from the group consisting of $C_1$-$C_6$ alkyl, $C_6$-$C_{12}$ aryl, $C_7$-$C_{12}$ alkylaryl and $C_7$-$C_{12}$ arylalkyl groups, wherein the alkyl groups may be linear, branched or cyclic including cyclic groups such as caprolactamyl (1-aza-2-cycloheptanon-1yl), a heterocyclic five or six membered group comprising 3-12 carbon atoms and 1-3 heteroatoms selected from the group consisting of O, S and N such as imidazole. According to the present invention, the "activated amine group" is preferably caprolactamyl (1-aza-2-cycloheptanon-1yl) or an 1-imidazolyl group.

A "thiol" denotes a —SH group.

A "halogen" denotes a —X group, where X is chlorine, bromine or iodine.

Formulation of the 4H Building Block

The 4H building block used in the process for the preparation of supramolecular polymers of the present invention is preferably formulated as a liquid at temperatures lower than about 100° C.

The liquid formulation comprising the 4H building block has preferably a kinematic viscosity of about 20 to 2000 cSt at about 100° C., preferably at about 90° C., more preferably at about 80° C., most preferably at about 40° C.

In a first, preferred, embodiment of this invention the liquid formulation comprises a 4H building block and a reactive solvent. Preferably, part of the reactive solvent is consumed in the synthesis of the 4H building block such that the formulation is directly obtained upon preparation of the 4H building block (a 'one-pot' process).

In a second embodiment of this invention, the liquid formulation of a 4H building block comprises a 4H building block according to formula (I), in which L is a polymer.

In said first preferred embodiment, the liquid formulation of the 4H building block is obtained by i) using an excess of a liquid polyisocyanate, or ii) using an excess of a liquid polyol, a liquid polyamino-alcohol, or a liquid polyamine. Alternatively, the 4H building block, the liquid polyisocyanate, the liquid polyol, the liquid polyamino-alcohol, or the liquid polyamine, and the pre-polymer may be mixed to form a reaction mixture. Preferably, the liquid polyisocyanate, the liquid polyol, the liquid polyamino-alcohol, or the liquid polyamine have preferably a dynamic viscosity at 22° C. of about 0.1 to about 5 Pa·s and/or a number average molecular weight of about 56 to about 500 Dalton. Preferably, the molar ratio of the 4H building block to the liquid polyisocyanate, the liquid polyol, the liquid polyamino-alcohol, or the liquid polyamine is between about 1 to about 3-10, preferably about 1 to about 3-6.

In the first preferred method i) of the first preferred embodiment, an isocytosine-derivative according to formula (5) or a melamine-derivative according to formula (6) (and/or tautomers thereof), with X, $R^2$ and $R^3$ as defined above, preferably an isocytosine, is reacted with a polyisocyanate having preferably a dynamic viscosity at 22° C. of about 0.1 to about 5 Pa·s, The molar ratio of the 4H building block to the liquid polyisocyanate is preferably between about 1 to about 3-10, preferably about 1 to about 3-6, to form a 4H building block according to formula (I) with $F_i$=NCO formulated in a polyisocyanate.

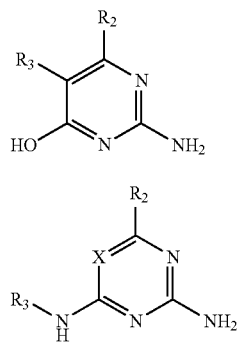

(5)

(6)

The polyisocyanate has an average isocyanate-functionality of 1.5 to 5, preferably 2 to 3, most preferably 2, according to formula Y(—NCO)$_n$ with n=1.5 to 5, wherein Y represents a $C_2$-$C_{24}$ alkylene group, a $C_6$-$C_{24}$ arylene group, a $C_7$-$C_{24}$ alkylarylene group or a $C_7$-$C_{24}$ arylalkylene group, optionally interrupted by 1 to 6 hetero atoms selected form N, O and S. The polyisocyanate may include biuret, urethane, uretdione, and isocyanurate derivatives. The polyisocyanate Y(—NCO)$_n$ is preferably selected from the group consisting of toluene diisocyanate (TDI), methylene diphenyl diisocyanate (MDI), methylene dicyclohexane 4,4-diisocyanate (HMDI), isophorone diisocyanate (IPDI), hexane diisocyanate (HDI), 1,3-xylylene diisocyanate, 1,4-xylylene diisocyanate, uretdione dimers of hexane diisocyanate, and cyclic trimers (isocyanurates) of HDI and IPDI, more preferably from the group consisting of isophorone diisocyanate, methylene dicyclohexane 4,4-diisocyanate, methylene diphenyl diisocyanate, uretdione dimer of hexane diisocyanate, 1,6-diisocyanato-2,2,4-trimethylhexane, and 1,6-diisocyanato-2,4,4-trimethylhexane. Most preferably, the diisocyanate OCN—Y—NCO is methylene dicyclohexane 4,4-diisocyanate (HMDI), methylene diphenyl diisocyanate, or uretdione dimer of hexane diisocyanate.

In the second method ii) of the first preferred embodiment, a 4H building block comprising an isocyanate according to formula (I) with $F_i$=—NCO, is reacted with an excess of a liquid polyol, liquid polyamino-alcohol, or liquid polyamine, preferably a liquid polyol, wherein the liquid polyol, the liquid polyamino-alcohol, or the liquid polyamine have preferably a viscosity at 22° C. of 0.1 to 5 Pa·s and a molecular weight of about 56 to about 500 Dalton. The molar ratio of the isocyanate 4H-unit to the liquid polyol, the liquid aminoalcohol, or the liquid polyamine is preferably between about 1 to about 3-10, preferably about 1 to about 3-6, to form a new 4H building block according to formula (I) with $F_i$=—OH or —NH$_2$ formulated in a liquid polyol, liquid polyamino-alcohol, or liquid polyamine. The liquid polyol, liquid polyaminoalcohol, or liquid polyamine has an average functionality of 1.5 to 5, preferably 2 to 3, most preferably 2, according to Formula (II) Z(-G)$_n$ with n=1.5 to 5, wherein Z is a $C_2$-$C_{24}$ alkylene group, a $C_6$-$C_{24}$ arylene group, a $C_7$-$C_{24}$ alkylarylene group or a $C_7$-$C_{24}$ arylalkylene group, optionally interrupted by 1 to 6 hetero atoms selected form N, O and S; and G represent —OH and/or —NH$_2$. Non-limiting examples of diols are ethylene glycol, diethylene glycol, triethyleneglycol, 1,2-propylene glycol, 1,3-propylene glycol, tetramethylene glycol, 1,5-pentanediol, 1,6-hexandediol, neopenylglycol, and 1,4-butanediol.

In the second embodiment of this invention an isocytosine-derivative according to formula (5) or a melamine-derivative according to formula (6), preferably an isocytosine derivative, is reacted with an isocyanate functional prepolymer obtained by the reaction of polymer having two hydroxy-endgroups with about 2 to 6 molar equivalents of diisocyanate, preferably with about 2 to 3, and most preferably with about 2 molar equivalents of diisocyanate to form a functional 4H-unit according to formula (I) with $F_i$=NCO. In which the polymer with two hydroxy endgroups has a glass transition ($T_g$) below 50° C., preferably below 20° C., and most preferably below −20° C., additionally said polymer has no melt transition ($T_m$) higher than −20° C. Preferably, the number average molecular weight of the polymer with two hydroxy endgroups is in between about 450 and about 4000 Da, more preferably in between about 500 and about 2500 Da. The diisocyanates are selected the group consisting of toluene diisocyanate (TDI), methylene diphenyl diisocyanate (MDI), methylene dicyclohexane 4,4-diisocyanate (HMDI), isophorone diisocyanate (IPDI), hexane diisocyanate (HDI), 1,3-xylylene diisocyanate, 1,4-xylylene diisocyanate, uretdione dimers of HDI, more preferably from the group consisting of IPDI, HMDI, MDI, TDI, 1,6-diisocyanato-2,2,4-trimethylhexane, and 1,6-diisocyanato-2,4,4-trimethylhexane. Most preferably, the diisocyanate is isophorone diisocyanate (IPDI) or methylene dicyclohexane 4,4-diisocyanate (HMDI).

Preparation of the Supramolecular Polymer

The present invention relates to a process for the preparation of a supramolecular polymer using the liquid formulation of the 4H building block. Preferably, the supramolecular polymer is a polymer comprising at least two 4H-units. Hence, the supramolecular polymer comprises about 1-50 4H-units, preferably about 1.5-20, more preferably about 2-10, and most preferably about 3-10 4H-units. The 4H-units are covalently attached to the polymer chain. The present invention also relates to a supramolecular polymer obtainable by said process.

It is preferred that the polymer used to prepare the supramolecular polymer is a polyol with an average hydroxyl number in between about 18 to 300, more preferably in between 18 to 150 mg KOH/g, and hydroxyl functionalities in between 1.5 to 3.5, more preferably in between 1.8 and 2.2. The polyol further has a molecular weight in between 500 to 6000, more preferably in between 500 to 2500 Da. Polyols are well known in the art and are preferably selected from the group consisting of hydroxy-terminated polyethers (preferably aliphatic polyethers), aliphatic polyesters, partly aromatic polyesters, aromatic polyesters, polyamides (preferably aliphatic polyamides; for example polypeptides), polycarbonates (preferably aliphatic polycarbonates), polyorthoesters, polysiloxanes, (hydrogenated) polybutadienes, and poly(meth)acrylates, or mixtures thereof. It is even more preferred that the supramolecular polymer is selected from the group consisting of aliphatic polyethers, aliphatic polyesters, partly aromatic polyesters, aliphatic polyamides, aliphatic polycarbonates, aliphatic polyorthoesters, or mixtures thereof. It is most preferred that the supramolecular polymer is selected from aliphatic polyethers and aliphatic polyesters or mixtures thereof. In another embodiment of this invention, the supramolecular polymer comprises a blend of supramolecular polymers, for example blends of the preferred groups of supramolecular polymers disclosed above.

According to a preferred embodiment of the invention, the supramolecular polymer is selected from the group consisting of polyethers and copolyethers based on ethylene oxide, propylene oxide, and/or tetrahydrofuran; polyesters and copolyesters based on adipic acid, succinic acid, phthalic acid, and diols, preferably glycols, butanediols or hexanediols; polyesters and copolyesters based on ε-caprolactone, glycolide, lactide, δ-valerolactone, 1,4-dioxane-2-one, 1,5-dioxepan-2-one, or oxepan-2,7-dione; polycarbonates and copolycarbonates based on 1,6-hexanediol polycarbonate; polycarbonates and copolycarbonates based on trimethylenecarbonate, 1,3-dioxepane-2-one, 1,3-dioxanone-2-one, or 1,3,8,10-tetraoxacyclotetradecane-2,9-dione; or polyorthoesters based on 3,9-diethylene-2,4,8,10-tetraoxaspiro[5.5]undecane.

According to the first method in the first preferred embodiment and to the second preferred embodiment, the supramolecular polymer is obtainable by the reaction of the isocyanate 4H-unit with the polyol, optionally in the presence of a chain extender, in which the different quantities of the different components depend on the nature of the supramolecular polymer to be produced and will be easily ascertained by someone skilled in the art. Preferably, the total amount of hydroxy- and amine-functions present in said polyol and the optional chain extender, is at least the amount of non-reacted isocyanate functions in said reaction mixture.

According to the second method in the first preferred embodiment, the supramolecular polymer is obtainable by the reaction of the 4H-unit with an isocyanate functional polyol, optionally in the presence of a chain extender, in which the different quantities of the different components depend on the nature of the supramolecular polymer to be produced and will be easily ascertained by someone skilled in the art. Preferably, the total amount of hydroxy- and amine-functions present in said polyol and the optional chain extender, is at least the amount of non-reacted isocyanate functions in said reaction mixture.

The isocyanate functional polyol is obtainable by the reaction of a polymer having two hydroxy-endgroups with about 1 to 4 equivalents of diisocyanate per hydroxy-function, preferably with about 1 to 2, and most preferably with about 1 equivalents of diisocyanate. The diisocyanates are selected the group consisting of toluene diisocyanate (TDI), methylene diphenyl diisocyanate (MDI), methylene dicyclohexane 4,4-diisocyanate (HMDI), isophorone diisocyanate (IPDI), hexane diisocyanate (HDI), 1,3-xylylene diisocyanate, 1,4-xylylene diisocyanate, uretdione dimers of HDI, more preferably from the group consisting of IPDI, HMDI, MDI, TDI, 1,6-diisocyanato-2,2,4-trimethylhexane, and 1,6-diisocyanato-2,4,4-trimethylhexane. Most preferably, the diisocyanate is isophorone diisocyanate (IPDI) or methylene dicyclohexane 4,4-diisocyanate (HMDI).

The process is optionally conducted in the presence of a chain extender which is a polyolol, a polyamino-alcohol, or a polyamine according to Formula (II) $Z(-G)_n$, in which Z, G, and n are as defined before, or mixtures thereof, wherein the polyolol, the polyamino-alcohol, or the polyamine has preferably a molecular weight of about 56 to about 500 Dalton. Non-limiting examples of diols are ethylene glycol, diethylene glycol, triethyleneglycol, 1,2-propylene glycol, 1,3-propylene glycol, tetramethylene glycol, 1,5-pentanediol, 1,6-hexandediol, neopenylglycol, and 1,4-butanediol.

The process for the preparation of the supramolecular polymer according to this invention can be done by any method known in the art, for example by simply mixing in a cup, by using a Banbury-type mixer, by using a Brabender mixer, by using a single screw extruder, or by using a twin screw extruder. The process is preferably performed between about 10° C. and about 100° C., more preferably between about 10° C. and about 90° C., and most preferably between about 20° C. and about 80° C.

In one embodiment of the invention no catalyst is added to the reaction mixture, for example, when isocyanates are reacted with amines or in some cases where no stoichiometric amounts of reactants are used. This is preferred when complete absence of residual catalyst is required for the use of the material, for example in biomedical applications. In another embodiment of this invention a catalyst is added to the reaction mixture that promotes the reactions between the complementary groups. Examples are catalysts known in the art that promote the reaction between isocyanates and hydroxyl groups that are derived from tertiary amines such as 1,4-diazabicyclo[2.2.2]octane (DABCO) or 1,8-diazabicyclo[5.4.0]undec-7-ene (DBU), or derived from transition metals, such as tin(II)octanoate, dibutyltin(IV)laurate or zirconium (IV)acetoacetate. Preferably, these catalyst are tin(IV) or zirconium(IV) compounds. The amount of catalyst is generally below about 1% by weight, preferably below about 0.2% by weight and most preferably below about 0.03% by weight of the total amount of reactants.

During the preparation of the supramolecular polymer, less than about 10 weight % of non-reactive organic solvent is present, preferably less than about 5 weight %, more preferably less than about 1 weight % and most preferably no non-reactive solvent is present. These weight percentages are based on the total weight of the reaction mixture. It is also preferred that the reaction mixture does not comprise any inorganic solvents such as water. Non-reactive solvents are preferably selected from non-protic organic solvents known in the art.

The supramolecular polymer can be isolated as such, or can be chopped in pellets, spun in fibers, extruded into films, directly dissolved in a medium of choice, or transformed or formulated into whatever form that is desired.

Applications

The supramolecular polymers according to the invention are preferably suitable for applications related to coating and adhesives applications. The present invention therefore also relates to a coating composition comprising the supramolecular polymer, and to an adhesive composition comprising the supramolecular polymer.

EXAMPLES

The following examples further illustrate the preferred embodiments of the invention. When not specifically mentioned, chemicals are obtained from Aldrich.

Examples 1 to 4 describe functional 4H-units in a liquid formulation

Example 1

2-Acetylbutyrolactone (2 mL) and guanidine carbonate (3.3 g) were put to reflux in absolute ethanol (20 mL) in the presence of triethylamine (5.2 mL). The solution became yellow and turbid. After overnight heating at reflux, the solid was filtered, washed with ethanol, and suspended in water. The pH was adjusted to a value of 6-7 with an HCl-solution, and the mixture was stirred for a while. Filtration, rinsing of the residue with water and ethanol and subsequent drying of the solid gave the pure 5(2-hydroxy ethyl)-6-methyl isocytosine. 1H NMR (400 MHz, DMSO-$d_6$): δ 11.2 (1H), 6.6 (2H), 4.5 (1H), 3.4 (2H), 2.5 (2H), 2.1 (3H).

The obtained isocytosine (3.21 g) was suspended in isophorone diisocyanate (IPDI, 26.8 g) and stirred for 16 h at 110° C. under an argon atmosphere, after which it was cooled to 40° C. resulting in a viscous hazy solution containing a 4H-unit with isocyanate functions formulated in IPDI.

Example 2

Methylisocytosine (5.2 g) was added to isophoronediisocyanate (IPDI, 50 mL) and subsequently stirred at 90° C. under an argon atmosphere for 3 days. After cooling down to 20° C. an isocyanate functional 4H-unit was obtained formulated in IPDI.

Example 3

The liquid formulation obtained in Example 2 was precipitated in heptane. The white gom was collected, heated in 150 mL heptane, cooled on ice, and filtered. The same procedure was repeated once more with the white residue, resulting in a white powder formed by the isocyanate functional 4H-unit. 1H NMR (400 MHz, $CDCl_3$): δ 13.1 (1H), 12.0 (1H), 10.1 (1H), 5.9 (1H), 4.1-3.1 (3H), 2.1 (3H), 2.0-0.9 (15H).

The obtained powder was subsequently suspended in butane diol (875 mg) and heated to 100° C. for 1 h resulting in a clear liquid, which was subsequently cooled to 20° C. and isolated as a clear oil.

Example 4

Methylisocytosine (0.67 g) was added to methylene dicyclohexane 4,4-diisocyanate (8.39 g) and subsequently stirred at 110° C. under an argon atmosphere for 16 h. After cooling down to 40° C. an isocyanate functional 4H-unit was obtained formulated in methylene dicyclohexane 4,4-diisocyanate.

Example 5

Hydroxy terminated polyethyleneglycol with a $M_n$ of 600 (4.30 g) was dried at 100° C. in vacuo for 2 hours followed by the addition of IPDI (741 mg) at 40° C. and 1 drop DBTDL, and subsequently stirred for 3 h at 40° C. under an argon atmosphere. To this reaction mixture the 5(2-hydroxy ethyl)-6-methyl isocytosine (135 mg), obtained in Example 1, was added and subsequently stirred at 120° C. for 1 h. The reaction mixture was cooled to 20° C. resulting in a liquid bis(isocyanate) functional 4H-unit.

Examples 6 to 9 describe syntheses of the supramolecular polymers from the liquid formulations of the functional 4H-unit

Example 6

The isocyanate functional 4H-unit formulated in IPDI from Example 1 (30.0 g) was mixed with Pripol 2033™ (1,ω-bis-hydroxyfunctional C36 compound marketed by Croda) and 1 drop of DBTDL and stirred at 100° C. for 6 h, followed by cooling to 70° C. and the addition of 2 mL ethanol. After 1 h the polymer was collected and cooled to 20° C. resulting in semi-rigid polymer.

Example 7

The isocyanate functional 4H-unit formulated in methylene dicyclohexane 4,4-diisocyanate from Example 4 (9.07 g) was mixed with hydroxy-terminated poly(neopenylglycoladipate) (13.0 g, $M_n$=600) and one drop of DBTDL and stirred for 2 h at 100° C. under an argon atmosphere, followed by the addition of 1.70 g butanediol and subsequent stirring at 100° C. for 12 h. After which the polymer mass was isolated and cooled to 20° C. resulting in a flexible clear material.

Example 8

Bis-hydroxy-functional polycaprolactone (PCL, $M_n$=1250, 1.25 g), predried in vacuo at 100° C., was mixed with IPDI (1.25 g) at 40° C. followed by the addition of 1 drop DBTDL and stirred for 3 h under an argon atmosphere resulting in a clear liquid. This reaction mixture was mixed with the liquid formulation of Example 3 (0.81 g) comprising the hydroxy-functional 4H-unit. The liquid mixture was stirred for 5 minutes after which it was poured into a Teflon mould and heated to 70° C. for 6 h after which a clear flexible material was obtained.

Example 9

Hydroxy-terminated poly(ethyleglycol-ran-propyleneglycol) (2.6 g, $M_n$=2500), predried in vacuo at 100° C., was mixed with the liquid formulation of Example 5 comprising the bis(isocyanate) functional 4H-unit for 5 minutes after which it was poured into a Teflon mould and heated to 70° C. for 6 h after which a clear flexible material was obtained.

What is claimed is:

1. A process for the preparation of a supramolecular polymer comprising about 1-50 4H-units, the process comprising reacting a 4H building block comprising a reactive group with a prepolymer and a chain extender in a reaction mixture comprising less than 10 wt. % of a non-reactive organic solvent, based on the total weight of the reaction mixture, wherein the 4H building block is formulated as a liquid at a temperature lower than about 100° C. and comprises a 4H-unit and a reactive group according to Formula (I):

4H-(L-$F_i$)$_r$          (I)

wherein 4H represents a 4H-unit;
L represents a polymeric group having a molecular weight between 500 and 5000 Da;
$F_i$ represents a reactive group;
r is 1-4;
the prepolymer is an isocyanate functional polyol; and
the chain extender has the Formula (II):

Z(-G)$_n$          (II)

wherein n=2 to 5;
Z is a $C_2$-$C_{24}$ alkylene group, a $C_6$-$C_{24}$ arylene group, a $C_7$-$C_{24}$ alkylarylene group or a $C_7$-$C_{24}$ arylalkylene group, optionally interrupted by 1 to 6 hetero atoms selected form N, O and S; and
G represents —OH and/or —$NH_2$.

2. The process according to claim 1, wherein the reacting is performed at a temperature between about 10° C. and about 100° C.

3. The process according to claim 1, wherein L is a divalent linking group.

4. The process according to claim 3, wherein the 4H building block is represented by:

4H-L-F$_1$ or F$_1$-L-4H-L-F$_1$ or F$_1$-L-4H-L-F$_2$ wherein F$_1$ and F$_2$ are independent reactive groups.

5. The process according to claim 1, wherein L is a linking group having a glass transition temperature below 0° C.

6. The process according to claim 5, wherein L is selected from the group consisting of aliphatic polyethers, aliphatic polyesters, aliphatic polycarbonates, polyorthoesters, polysiloxanes, (hydrogenated) polybutadienes, and poly(meth)acrylates.

7. The process according to claim 1, wherein the 4H-unit is according to Formula (III) or Formula (IV):

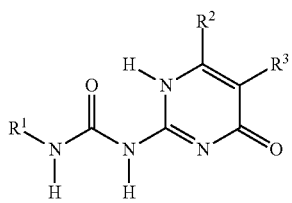

(III)

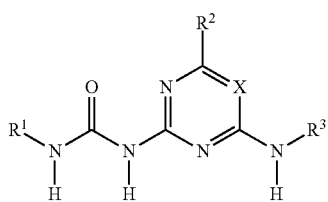

(IV)

wherein X is a nitrogen atom or a carbon atom bearing a substituent R$^8$, and wherein R$^1$, R$^2$, R$^3$ and R$^8$ are independently selected from the group consisting of hydrogen, C$_1$-C$_{20}$ alkyl, C$_6$-C$_{12}$ aryl, C$_7$-C$_{12}$ alkaryl, and C$_7$-C$_{12}$ alkylaryl, or wherein R$^1$, R$^2$ and R$^3$ are independently a direct bond.

8. The process according to claim 7, wherein X is a nitrogen atom.

9. The process according to claim 7, wherein the 4H-unit is represented by Formula (III).

10. The process according to claim 9, wherein R$^2$ and R$^3$ are independently selected from the group consisting of hydrogen, C$_1$-C$_{20}$ alkyl, C$_6$-C$_{12}$ aryl, C$_7$-C$_{12}$ arylalkyl, and C$_7$-C$_{12}$ alkylaryl and the 4H building block is represented by Formula (IIIa)

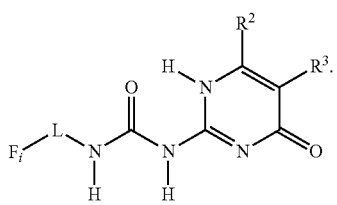

(IIIa)

11. The process according to claim 9, wherein R$^2$ is selected from the group consisting of hydrogen, C$_1$-C$_{20}$ alkyl, C$_6$-C$_{12}$ aryl, C$_7$-C$_{12}$ arylalkyl, and C$_7$-C$_{12}$ alkylaryl and the 4H building block is represented by Formula (IIIc)

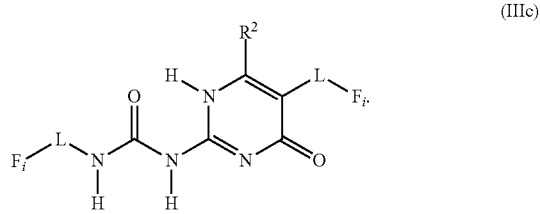

(IIIc)

12. The process according to claim 10, wherein R$^2$ is methyl.

13. The process according to claim 11, wherein R$^2$ is methyl.

14. The process according to claim 1, wherein the reaction mixture comprises a liquid polyisocyanate, a liquid polyol, a liquid polyamino-alcohol, or a liquid polyamine, each having has a dynamic viscosity at 22° C. of about 0.1 to about 5 Pa·s and/or a number average molecular weight of about 56 to about 500 Dalton.

15. The process according to claim 14, wherein the molar ratio of the 4H building block to liquid polyisocyanate, liquid polyol, liquid polyamino-alcohol, or liquid polyamine is between about 1 to about 3-10.

16. The process according to claim 15, wherein the liquid polyisocyanate is selected from the group consisting of isophorone diisocyanate, methylene dicyclohexane 4,4-diisocyanate, methylene diphenyl diisocyanate, uretdione dimer of hexane diisocyanate, 1,6-diisocyanato-2,2,4-trimethylhexane, and 1,6-diisocyanato-2,4,4-trimethylhexane.

17. The process according to claim 1, wherein no organic solvent is present in the reaction mixture.

18. The process according to claim 1, wherein no solvent is present in the reaction mixture.

19. A coating composition comprising the supramolecular polymer obtained by the process according to claim 1.

20. An adhesive composition comprising the supramolecular polymer obtained by the process according to claim 1.

21. The process according to claim 1, wherein the isocyanate functional polyol is obtained by the reaction of a polymer having two hydroxy-endgroups with about 1 to 4 equivalents of diisocyanate per hydroxy-function.

22. The process according to claim 21, wherein the diisocyanate is selected from the group consisting of toluene diisocyanate, methylene diphenyl diisocyanate, methylene dicyclohexane 4,4-diisocyanate, isophorone diisocyanate, hexane diisocyanate, 1,3-xylylene diisocyanate, 1,4-xylylene diisocyanate, and uretdione dimers of hexane diisocyanate.

23. The process according to claim 1, wherein the liquid has a kinematic viscosity of about 20 to about 2000 cSt at 100° C.

* * * * *